(12) United States Patent
Burr et al.

(10) Patent No.: US 7,956,332 B2
(45) Date of Patent: Jun. 7, 2011

(54) MULTI-LAYER RADIATION DETECTOR ASSEMBLY

(75) Inventors: Kent Charles Burr, Mayfield, OH (US); Joseph John Shiang, Niskayuna, NY (US); Aaron Judy Couture, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/260,819

(22) Filed: Oct. 29, 2008

(65) Prior Publication Data

US 2010/0102242 A1 Apr. 29, 2010

(51) Int. Cl.
G01T 1/20 (2006.01)
G01T 1/24 (2006.01)

(52) U.S. Cl. .......... 250/370.11; 250/361 R; 250/363.04; 378/19

(58) Field of Classification Search ..... 250/370.01–371; 257/432, 438, 186, 442; 378/5, 19, 62
See application file for complete search history.

(56) References Cited

U.S. PATENT DOCUMENTS

| | | | |
|---|---|---|---|
| 4,893,015 A | | 1/1990 | Kubierschky et al. |
| 5,079,426 A | | 1/1992 | Antonuk et al. |
| 5,233,181 A | | 8/1993 | Kwansnick et al. |
| 6,331,438 B1 | | 12/2001 | Aylott et al. |
| 6,355,921 B1 | | 3/2002 | Staton et al. |
| 7,403,589 B1 * | | 7/2008 | Short et al. ............ 378/19 |
| 7,652,257 B2 | | 1/2010 | Li et al. |
| 2002/0130266 A1 * | | 9/2002 | Kyyhkynen ............ 250/370.09 |
| 2003/0169847 A1 | | 9/2003 | Karellas et al. |
| 2004/0251420 A1 * | | 12/2004 | Sun ...................... 250/370.09 |
| 2005/0173641 A1 * | | 8/2005 | Unger et al. ............. 250/370.09 |
| 2007/0003006 A1 | | 1/2007 | Tkaczyk et al. |
| 2007/0069142 A1 | | 3/2007 | Moody et al. |
| 2007/0075251 A1 | | 4/2007 | Doughty et al. |
| 2007/0205367 A1 | | 9/2007 | Deman et al. |
| 2008/0230709 A1 * | | 9/2008 | Tkaczyk et al. ......... 250/370.09 |
| 2009/0129538 A1 * | | 5/2009 | Tkaczyk et al. ............ 378/5 |

FOREIGN PATENT DOCUMENTS

WO 2006034585 A1 4/2006

OTHER PUBLICATIONS

Kraft et al.; "Counting and Integrating Readout for Direct Conversion X-ray Imaging: Concept, Realization and First Prototype Measurements", IEEE Transactions on Nuclear Science, vol. 54, No. 2, Apr. 2007; pp. 383-290; 8 Pages.

Jackson, Carl; "Silicon photomultiplier detectors for low-light detection"; Downloaded from Internet:< http://www.photonics.com/content/spectra/2007/December/features/89895.aspx; v 41, n 12, Dec. 2007; 5 Pages.

(Continued)

*Primary Examiner* — David P Porta
*Assistant Examiner* — Casey Bryant
(74) *Attorney, Agent, or Firm* — Scott J. Asmus

(57) ABSTRACT

A technique is provided for forming a multi-layer radiation detector. The technique includes a charge-integrating photodetector layer provided in conjunction with a photon-counting photodetector layer. In one embodiment, a plurality of photon-counting photosensor elements are disposed adjacent to a plurality of charge-integrating photosensor elements of the respective layers. Both sets of elements are connected to readout circuitry and a data acquisition system. The detector arrangement may be used for energy discriminating computed tomography imaging and similar computed tomography systems.

25 Claims, 7 Drawing Sheets

OTHER PUBLICATIONS

Greenham et al, "Charge separation and transport in conjugated polymer/cadmium selenide nanocrystal composites studied by photoluminescence quenching and photoconductivity", Synthetic Metals, vol. 84, Issues 1-3, International Conference on Science and Technology of Synthetic Metals, 1997, pp. 545-546.

Street et al, "Printed active-matrix TFT arrays for x-ray imaging", SPIE Medical Imaging 2005: Physics of Medical Imaging, V5745, pp. 7-17.

Ng et al, "Flexible image sensor array with Bulk heterojunction organic photodiode", Applied Physics Letters 92, 213303 (2008), pp. 1-3.

Ramuz et al, "High sensitivity organic photodiodes with low dark currents and increased lifetimes", Organic Electronics, 9 (2008), pp. 369-376.

Blakesley et al, "Modeling the imaging performance of prototype organic x-ray imagers", Medical Physics 35 (1), 2008, pp. 225-238.

Mayr et al, "An optical sensor array on a flexible substrate with integrated organic opto-electric devices", Procedia Engineering 5 (2010), pp. 1005-1008.

Agostinelli et al, "A polymer/fullerene based photodetector with extremely low dark current for x-ray medical imaging applications", Applied Physics Letters 93, 203305 (2008), pp. 1-3.

Lee et al, "Effects of interlayers on phosphorescent blue organic light-emitting diodes", Applied Physics Letters 92, 203305, (2008), pp. 1-3.

\* cited by examiner

MULTI-LAYER RADIATION DETECTOR ASSEMBLY

BACKGROUND

The invention relates generally to radiographic detectors for diagnostic imaging and particularly to a method and system of forming a multi-layer detector array with improved saturation characteristics.

In radiographic systems, an X-ray source emits radiation (i.e., X-rays) towards a subject or object, such as a patient or luggage to be imaged. Hereinafter, the terms "subject" and "object" may be interchangeably used to describe anything capable of being imaged. The X-ray beams, after being attenuated by the subject or object, impinge upon an array of radiation detector elements of an electronic detector. The intensity of radiation beams reaching the detector is typically dependent on the attenuation and absorption of X-rays through the scanned subject or object. At the detector, a scintillator converts the X-ray radiation to lower energy optical photons that strike the detector elements. Each of the detector elements then produces a separate electrical signal indicative of the amount of X-ray radiation at the particular location of the element. The electrical signals are collected, digitized and transmitted to a data processing system for analysis and further processing to reconstruct an image.

Conventional CT imaging systems utilize detectors that convert radiographic energy into current signals that are integrated over a time period, then measured and ultimately digitized. A drawback of such detectors however is their inability to provide data or feedback as to the number and/or energy of photons detected. Such data could be used during image reconstruction to distinguish between different types of materials, a capability which is unavailable for images reconstructed by conventional CT systems that. In particular, in a conventional CT system, the detector is unable to provide energy discriminatory data or otherwise count the number and/or measure the energy of photons actually received by a given detector element or pixel. That is, the light emitted by the scintillator is a function of the number of X-rays impinged as well as the energy level of the X-rays. Under the charge integration operation mode, the photodiode is not capable of discriminating between the energy level and the photon count from the scintillation. For example, two scintillators may illuminate with equivalent intensity and provide equivalent output to their respective photodiodes. Yet, the number of X-rays received by each scintillator may be different as well as the X-rays' energy, but yield an equivalent light output.

In attempts to design scintillator based detectors capable of photon counting and energy discrimination, detectors constructed from scintillators coupled to either avalanche photodiodes (APDs) or photomultipliers have also been employed. However, there are varying problems that limit the use of these detectors. APDs require additional gain to enable photon counting, but suffer from added gain-instability noise, temperature sensitivity, and other reliability issues. Photomultiplier tubes are too large, mechanically fragile, and costly for high-resolution detectors covering large areas as used in CT. As such, photomultiplier tubes have been limited to use in PET or SPECT systems.

To overcome these shortcomings, energy discriminating, detectors capable of not only X-ray counting, but of also providing a measurement of the energy level of each X-ray detected have been employed in CT systems. In particular, direct conversion detectors encounter very high photon flux rates as with conventional CT systems. For high flux signals there is a possibility that multiple X-ray photons will deposit their charge in a time shorter than the response period of a single element. Hence, flux above a certain threshold may lead to detector non-linearity or saturation and loss of imaging information.

BRIEF DESCRIPTION

The present invention provides a system and method for X-ray photon detection in a radiation detector, which overcomes the above-mentioned needs. In accordance with a first aspect of the invention, a radiation detector, capable of operating over the entire range of fluxes in CT, is provided that includes a charge integrating photo detector layer, and a photon counting photodetector layer disposed beneath the charge integrating photo detector layer. Examples of suitable photon counting photodetector layers include, but are not limited to, conventional avalanche photodiode structures, wide bandgap semiconductors like CZT, and other photon counting photodetectors like pixilated photomultipliers or a Si-PMT structure. In one embodiment, the photon counting photodetector may be a solid state photomultiplier layer disposed beneath a charge integrating photodetector layer.

In accordance with another aspect of the disclosure, a method is provided for constructing a detector, and provides disposing a plurality of charge integrating photo sensor elements beneath a scintillator, disposing a plurality of photon counting photosensor elements adjacent to the plurality of charge integrating photosensor elements and electrically coupling the charge integrating photosensor elements and the photon counting photosensor elements to a data acquisition system.

In accordance with yet another aspect of the disclosure, a detector is provided for use in an imaging system. The detector includes a scintillator configured to receive X-rays on one side, a photosensor array disposed on an opposite side of the scintillator comprising a plurality of charge integrating photosensor elements and a plurality of photon counting photosensor elements. The detector further includes a data acquisition system coupled to the read out circuitry configured to provide a plurality of electrical signals based upon signals acquired from the charge integrating photosensor elements and the photon counting photosensor elements. The read out circuitry also distinguishes the signals of charge integrating photosensor elements and photon counting photosensor elements.

In accordance with a further aspect of the disclosure, an imaging system with a detector includes a radiation source configured to project X-ray photons towards the object. The detector module configured to receive X-ray photons attenuated by the object includes a scintillator to receive X-ray photons on one side thereof, a photosensor array optically coupled to the scintillator, wherein the photosensor arrays comprises a plurality of charge integrating photosensor elements and a plurality of photon counting photosensor elements and the read out circuitry coupled to the data acquisition system. The radiation source may be a single source or plurality of sources capable of emitting X-rays at different energies. Multilayer detector arrangements as discussed herein can be employed in X-ray systems that find application in both medical imaging and industrial imaging, such as baggage screening and non-destructive testing etc.

DRAWINGS

These and other features, aspects, and advantages of the present invention will become better understood when the following detailed description is read with reference to the accompanying drawings in which like characters represent like parts throughout the drawings, wherein.

Figure 1:
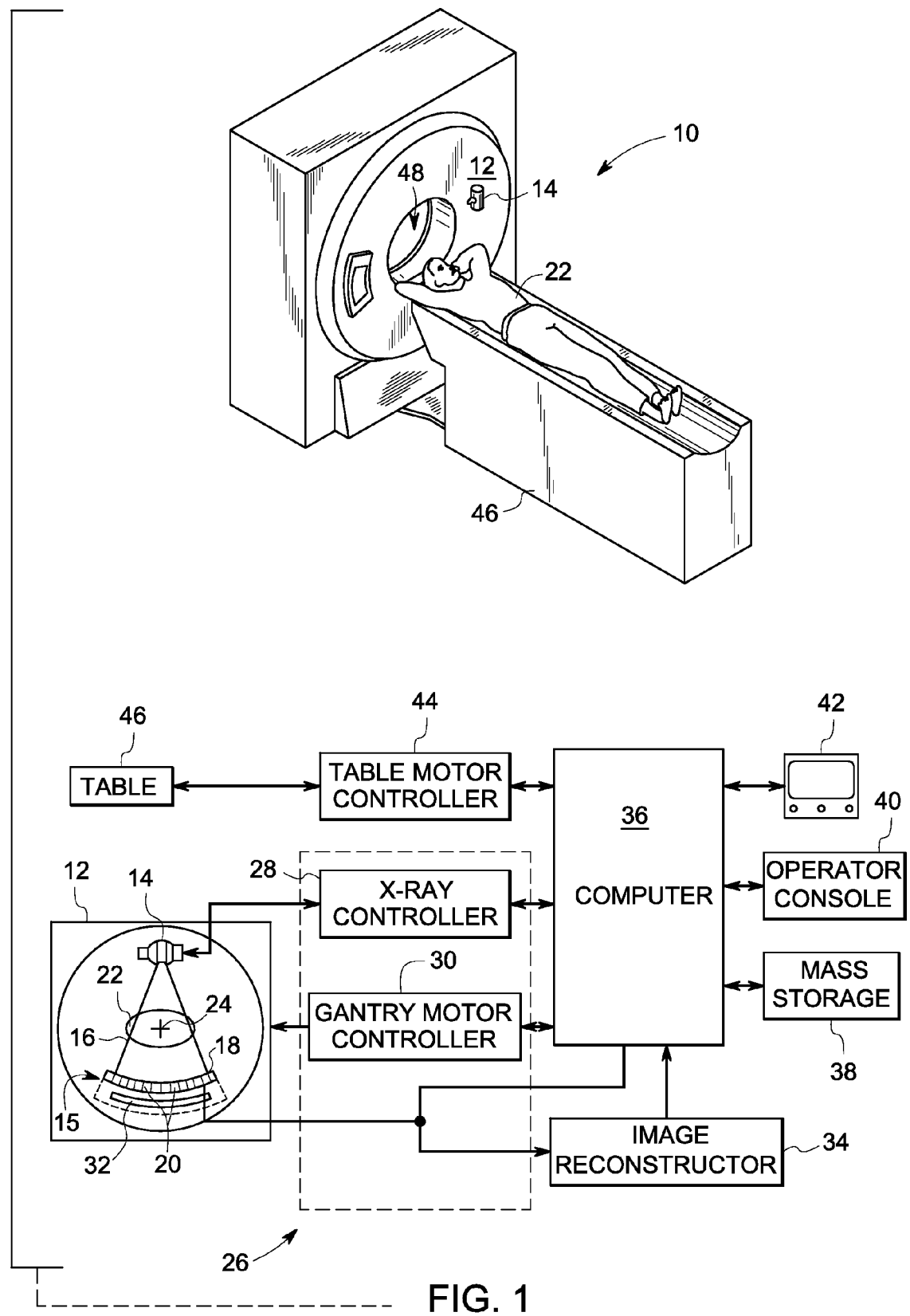
FIG. 1 is a combined pictorial view and block diagram of a CT imaging system in accordance with the present disclosure.
Figure 7:
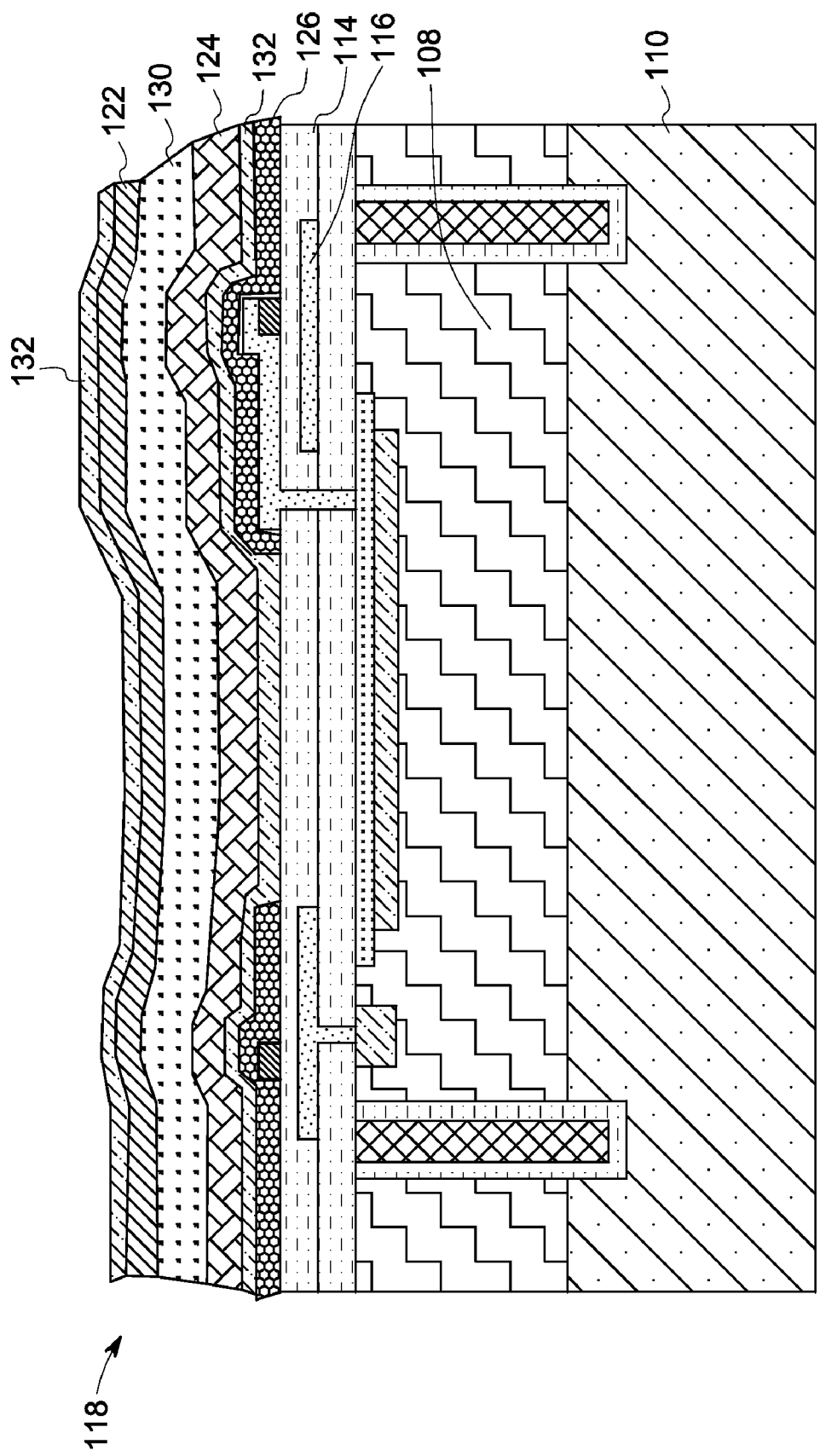
Figure 8:
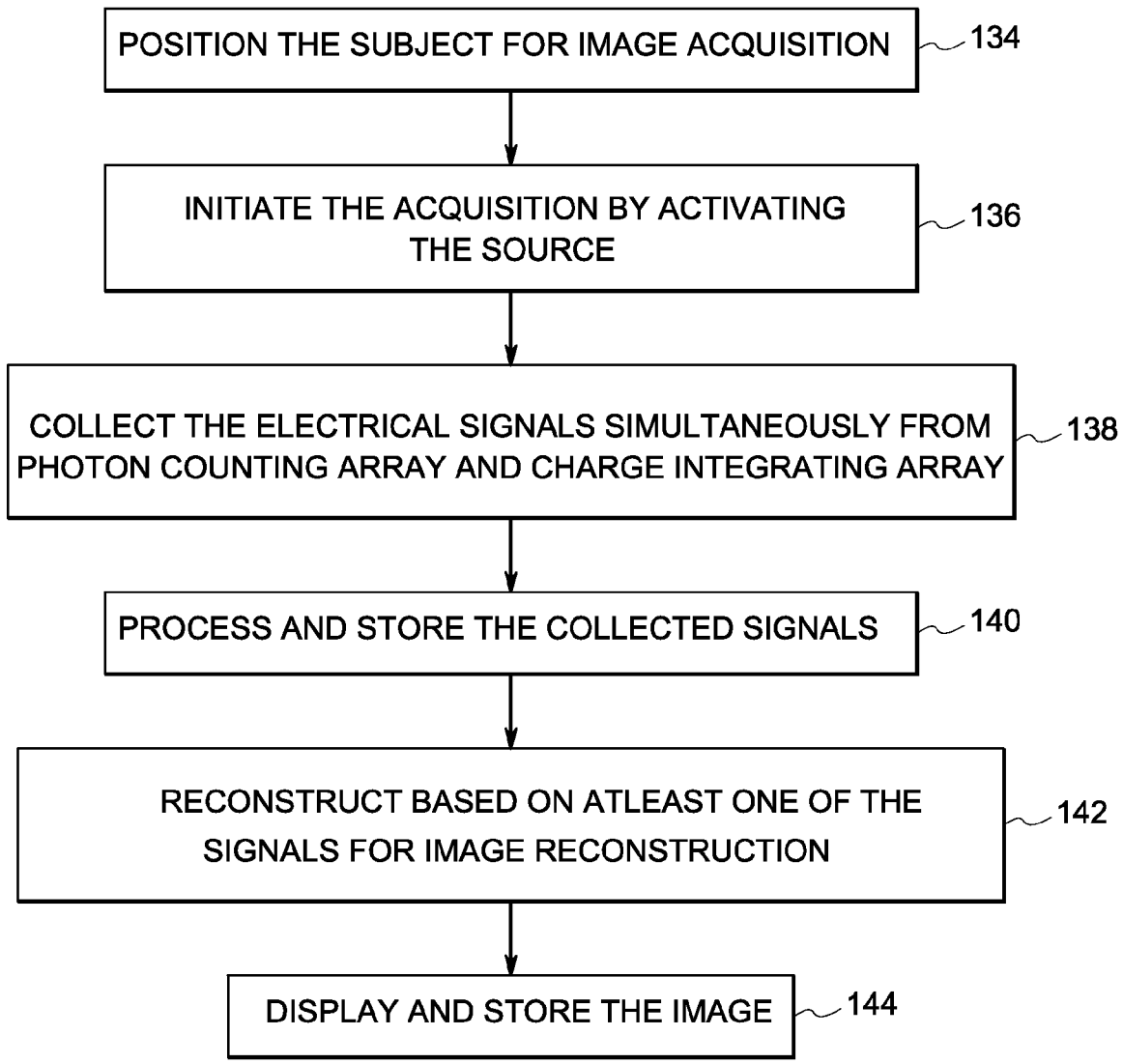

FIG. 7 is a cross sectional view of charge integrating diodes with semi-transparent amorphous silicon deposited over substantially the entire sensing area of a solid-state photomultiplier, in accordance with one embodiment of the present disclosure; and FIG. 8 is a flowchart illustrating an exemplary process for acquiring and processing image data via the detector module of FIG. 1, in accordance with one embodiment of the present disclosure.

DETAILED DESCRIPTION

In accordance with one aspect of the invention, a CT imaging system is provided. The CT imaging system includes a layer detector capable of performing both photon counting and energy discrimination of X-rays at any given flux rate simultaneously and includes a DAS with a readout which is capable of distinguishing both the energy integrating and photon counting data. The present discussion is provided in the context of a 3rd generation CT system. However, the present discussion is equally applicable to other systems. Though the discussion focuses primarily on detectors for measurement of X-ray flux levels or energy levels in a medical imaging context, non-medical applications such as security and screening systems and non-destructive detection systems are well within the scope of the present technique. Moreover, while the detector structure and arrangement may be used in energy discriminating computed tomography systems, the detector may be used in other systems, such as other X-ray systems, radiography systems, computed tomography systems not operating in energy discriminating mode, tomosynthesis systems, mammography systems, C-arm angiography systems and so forth.

Referring to FIG. 1, a computed tomography (CT) imaging system 10 is shown as including a gantry 12 representative of a "third generation" CT scanner. Gantry 12 has an X-ray source 14 that projects a beam of X-rays 16 toward a detector assembly 15 on the opposite side of the gantry 12. The detector assembly 15 includes a collimator assembly 18, a plurality of detector modules 20, and data acquisition systems (DAS) 32. In one embodiment, detector assembly 15 includes fifty-seven detector modules 20, with each detector module 20 having an array size of 64×16 pixel elements. As a result, in such an embodiment, detector assembly 15 has 64 rows and 912 columns (16×57 detectors) which allows 64 simultaneous slices of data to be collected with each rotation of gantry 12. The plurality of detector modules 20 sense the projected X-rays that pass through a medical patient 22, and DAS 32 converts the data to digital signals for subsequent processing. Each detector module 20 in a conventional system produces an analog electrical signal that represents the intensity of an impinging X-ray beam and hence the attenuated beam as it passes through the patient 22. During a scan to acquire X-ray projection data, gantry 12 and the components mounted thereon rotate about a center of rotation 24.

Rotation of gantry 12 and the operation of X-ray source 14 are governed by a control mechanism 26 of CT system 10. Control mechanism 26 includes an X-ray controller 28 that provides power and timing signals to an X-ray source 14 and a gantry motor controller 30 that controls the rotational speed and position of gantry 12. An image reconstructor 34 receives sampled and digitized X-ray data from DAS 32 and performs high-speed reconstruction. The reconstructed image is applied as an input to a computer 36, which stores the image in a mass storage device 38. Computer 36 also receives commands and scanning parameters from an operator via console 40. An associated display 42 allows the operator to observe the reconstructed image and other data from computer 36. The operator supplied commands and parameters are used by computer 36 to provide control signals and information to DAS 32, X-ray controller 28, and gantry motor controller 30. In addition, computer 36 operates a table motor controller 44, which controls a motorized table 46 to position patient 22 and gantry 12. Particularly, table 46 moves portions of patient 22 through a gantry opening 48.

Figure 2:
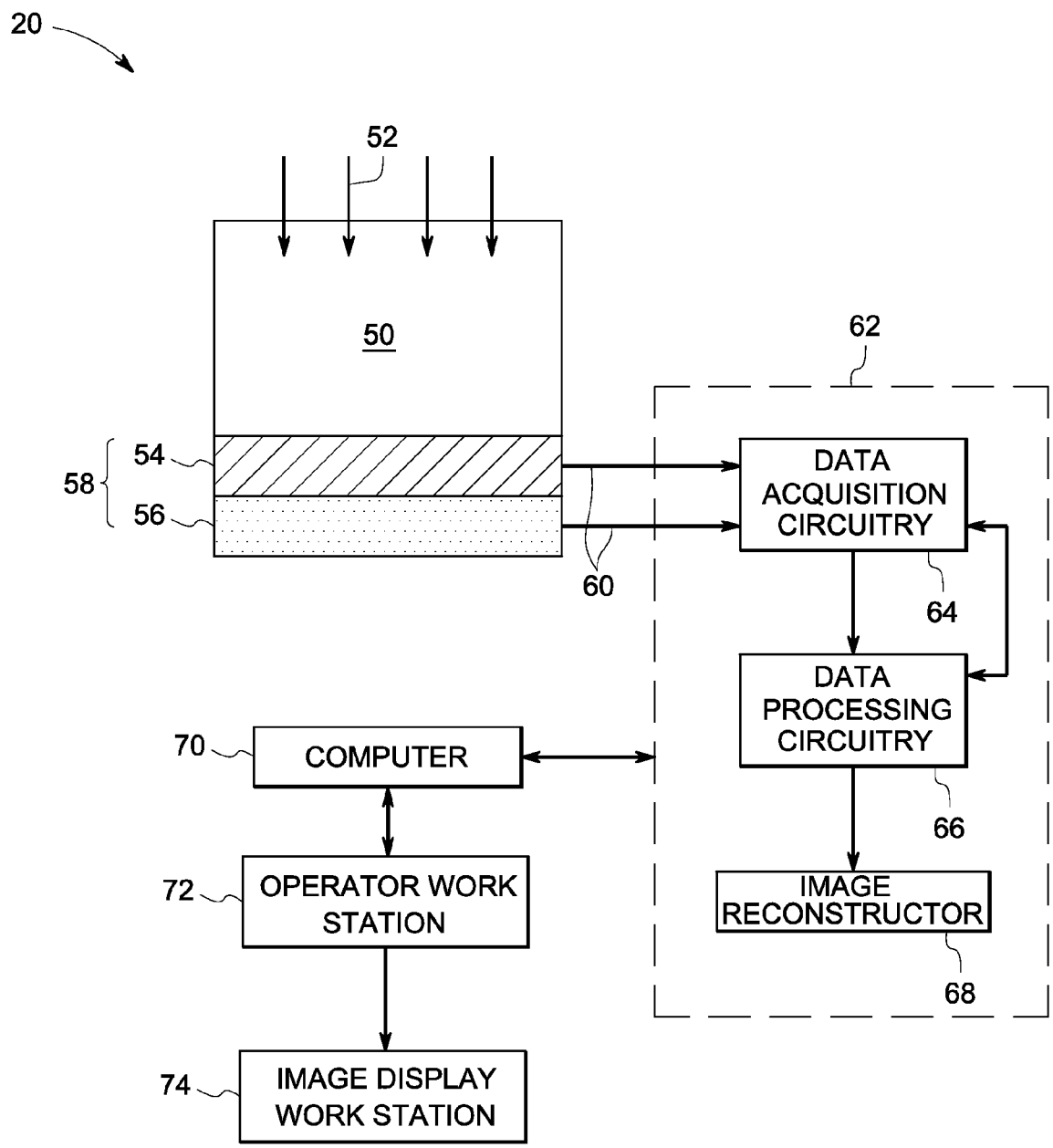
FIG. 2 depicts an exemplary detector module with photosensor layers, and its associated control circuitry for obtaining image data, in accordance with one embodiment of the present disclosure.

Referring now to FIG. 2, an exemplary radiation detector 20 with its control circuitry 62 operating in accordance with certain aspects of the present technique is illustrated. In the present context, the radiation detector 20 is explained in the context of X-ray detection. However, in other embodiments, the radiation detector 20 may be adapted to detect other forms of electromagnetic signals (like visible light). In the depicted embodiment, the radiation detector includes a scintillator 50, photo detector layers 58 and a control circuitry 62. The photo detector layers 58 include a charge integrating photo detector layer 54 and a photon counting photo detector layer 56 to detect both counting and integration signals. The photon counting aspect of the detector may employ photon counting photodetection techniques such as avalanche photodiode structures, wide bandgap semiconductor structures (like CZT), Si-PMT structures, and so forth. Other photon counting photodetection technologies, such as pixilated photomultipliers and gas electron multipliers, may also be employed. In one implementation, the photon counting photodetector layer 56 is a solid state photomultiplier layer (SSPM) disposed beneath the charge integrating photo detector layer 54 relative to incoming radiation 52.

In one embodiment, the associated control circuitry 62 includes read out circuitry 60, data acquisition circuitry 64, data processing circuitry 66 and an image reconstructor 68. In the depicted embodiment, the control circuitry 62 is in turn controlled by the computer 70, which may include or be in communication with an operator workstation 72 and/or an image display workstation 74. While in the illustrated embodiment, the control circuitry 62 is depicted external to the radiation detector module 20, in certain implementations, some or all of these circuitries may be provided as part of the detector assembly 20. Likewise, in certain embodiments some or all of the circuitry present in the control circuitry 62 may be provided as part of one or more of the computer 70, the operator workstation 72, and/or the image display workstation 74. Thus, in certain embodiments, aspects of the readout circuitry 60, data acquisition circuitry 64, data processing circuitry 66, image reconstruction circuitry 68, as well as other circuitry of the control circuitry 62, may be provided as part of the detector module 20 and/or as part of a connected computer 70 or workstation 72, 74.

During imaging, radiation 52 (i.e., X-rays) from an imaging source impinges on the scintillator 50 after being attenuated by an intervening subject or object undergoing imaging. Typically, the scintillator 50 is formed from substances that absorb radiation 52 (for example X-ray photons) and in response emit light of a characteristic wavelength, thereby releasing the absorbed energy. With regard to the present technique, various types of scintillation materials may be employed which convert the radiation incident on the detector assembly 20, such as X-rays photons, into a form of radiation detectable by the photodetector layers 58, such as optical or other lower energy photons. In one embodiment, individual photons emitted by the scintillator 50 can be individually detected by photodetector layers 58, such as by the photon counting photodetector layer 56. Thus, in such an implementation, individual X-ray photons impinging on the detector assembly 50 can be detected by the photodetector layers 58, so long as the impinging X-ray photons interact with the scintillator 50 to generate one or more detectable photons, such as optical photons.

The photo detector layers 58 generate electrical signals in response to the light emitted by the scintillator 50. Moreover, in certain embodiments, the photo detector layers 58 also provide a degree of signal amplification. The electrical signals generated by the photo detector layers 58 are in turn acquired by readout circuitry 60. The signals from the readout circuitry 60 are acquired by the data acquisition circuitry 64. In the depicted embodiment, the acquired signals are supplied to data processing circuitry 66 and/or to image reconstruction circuitry 68. The data processing circuitry 66, when present, may perform various functions such as gain correction, edge detection, sharpening, contrast enhancement, and so forth to condition the data for subsequent processing or image reconstruction. The image reconstruction circuitry or reconstructor 68 may in turn process the acquired or processed signals to generate an image for a region of interest (ROI) traversed by the radiation 52. The operator workstation 72 may be utilized by a system operator to provide control instructions to some or all of the components that aid in image generation. The operator workstation 72 may also display the generated image in a remote location, such as image display workstation 74.

As noted above, in the depicted embodiment the photo detector layers 58 of FIG. 2 include both a photon-counting photo detector layer 56 and a charge-integrating photo detector layer 54. In such an embodiment, the signals generated by the photon-counting photo detector layer 56 may allow for discriminating between different X-ray energy levels, i.e., the data is energy discriminating. The signals and data derived from the photon-counting photo detector layer 56 may be used when the count rate, i.e., X-ray flux, is sufficiently low as to allow detection of individual X-ray photons, i.e., photon counting. In one example, in one embodiment such photon counting may be accomplished when the photon count rate is below $1 \times 10^6$ cps/mm$^2$. Conversely, the signals and data derived from the charge-integrating photo detector layer 54 may be used when the count rate is too high to allow for individual photon detection. For example, in one embodiment, the charge integrating functionality may be employed when the photon count rate is above $1 \times 10^7$ cps/mm$^2$. In one embodiment, both the photon counting and charge integrating photo detector layers respond simultaneously, depending on the photon flux, which reduces the time delay involved in switching between the two modes of operation. In one embodiment, the photo detector layers 58 of FIG. 2 are capable of operating even at maximum count rates encountered in computed tomography (CT) imaging systems.

Figure 3:
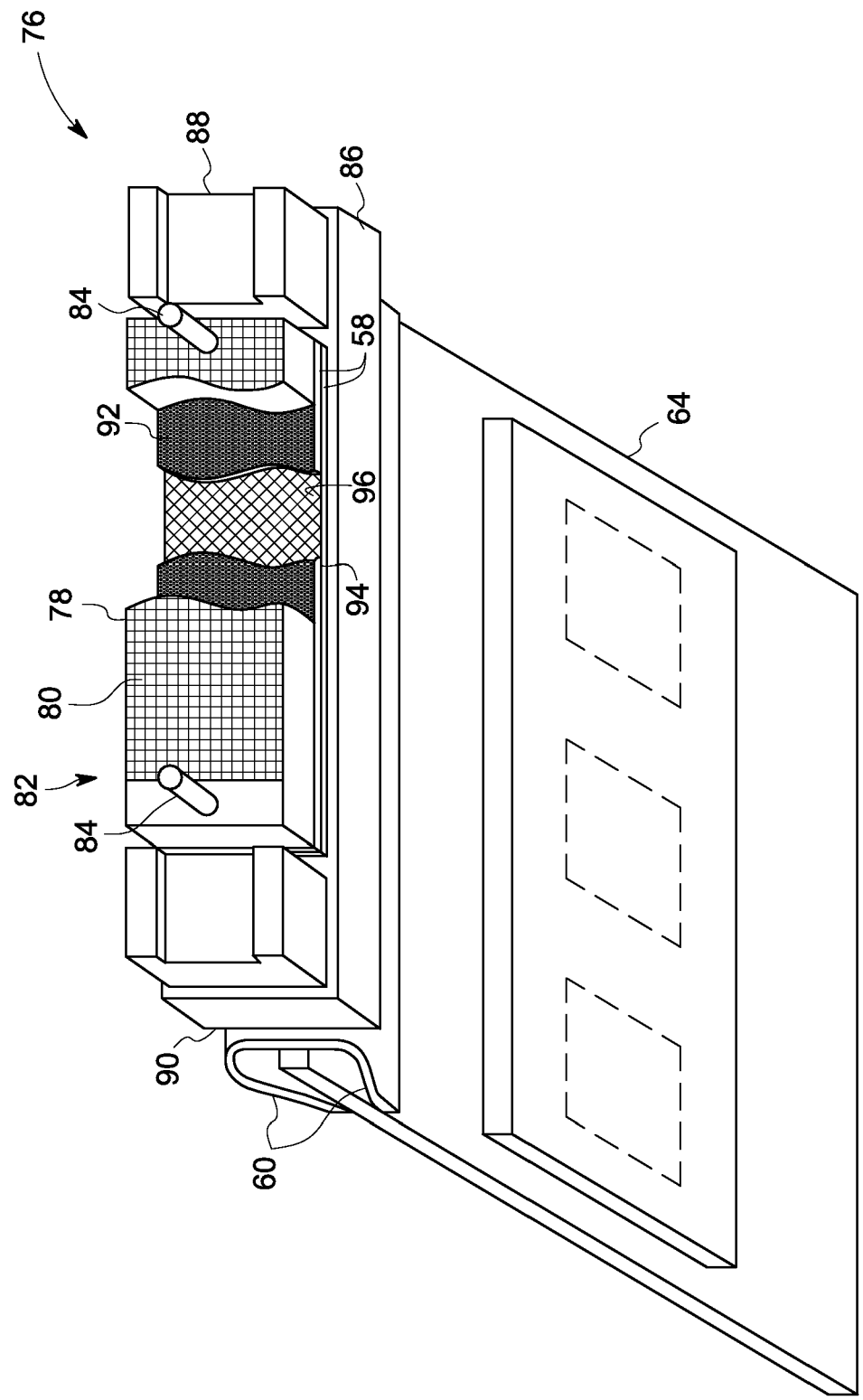
FIG. 3 is a perspective view of a detector, in accordance with one embodiment of the present disclosure.

Referring now to FIG. 3, the detector module 76 in an exemplary embodiment includes data acquisition circuitry 64 (such as a data acquisition system (DAS)), photo detector layers 58, and a scintillator 78 comprising a number of scintillator elements 80 arranged in pack 82. Detector module 76 includes pins 84 positioned within pack 82 relative to scintillator elements 80, and a reflective material is disposed between the individual scintillator elements 80, (i.e., pixel elements) that form scintillator 78. Pack 82 is positioned on photo detector layers 58, which are in turn disposed on a suitable layered substrate 86. In the depicted embodiment, scintillator elements 80 are optically coupled to the photosensor, which is in turn electrically coupled to the multilayered substrate 86. Spacers 88 may also be disposed on the substrate 86 for proper positioning or to create space between objects. In the depicted embodiment, flex circuits or read out circuitry 60 is attached to face 90 of a layered substrate 86 and to detector acquisition circuitry 64. In certain embodiments, the detector module may be positioned within a collimator assembly using pins 84.

In one embodiment, the detector module 76 includes a scintillator 78 configured to receive impinging X-rays 52 and generate light photons responsive thereto. For example, in one embodiment, the scintillator 78 is disposed on a side of the charge-integrating photo detector layer 54 opposite to the photon-counting photo detector layer 56 (see FIG. 2). In the depicted embodiment, the charge-integrating photo detector layer 54 consists of charge-integrating photosensor elements 92 disposed beneath the scintillator 78. Furthermore, the photon-counting photo detector layer 56 consists of photon-counting elements 94 disposed beneath the charge-integrating photo detector layer 54. The photo detector layers 58 receive light photons generated by the scintillator 78 and hence, convert them into analog electrical signals proportional to the energy of incident radiation. In one embodiment, the analog signals generated are carried through a layered substrate 86 to the detector acquisition circuitry 64, where the analog signals are converted to digital signals.

In these views, the photon-counting elements 94 and the charge-integrating elements 92 operate independently of one another and are all connected to a common substrate. Readout circuitry 60 acquires signals simultaneously from both the photon-counting photosensor elements 94 and charge-integrating photosensor elements 92. That is, there is no switching between photon-counting and charge-integrating modes of operation and instead both the charge-integrating and photon-counting operations are simultaneously performed and generate acquired data. The detector acquisition circuitry 64 communicates with the readout circuitry 60 to detect large numbers of photons in a short acquisition time and transfers large amounts of image data to components that perform processing and storage. Because data is acquired by the readout circuitry 60 and data acquisition circuitry 64 from both the photon-counting elements 94 and the charge-integrating elements 92 without switching between these modes of operation, the choice of which data is used for image reconstruction can be made after data acquisition, i.e., retrospectively, since both types of data are available after data acquisition.

In these embodiments, the scintillator elements 80 are pixilated and coupled to the photo detector layers. In one embodiment, the photon counting photosensor layer 94 comprises a solid state semiconducting material, such as a silicon photomultiplier. The photon counting photosensor comprises a plurality of macroscopic units called pixels. The number of pixels on the photon counting photosensor covers an area of the detector module 76 and corresponds to the pixelated scintillator 78 and the pixel elements 80 thereon, although the exact number and density of the pixels may be determined by image resolution desired by an operator and other known factors. A portion of a pixel may include a plurality of avalanche photodiodes (APDs) or "microcells" 96 that amplify single optical photon arrivals from the scintillator 78 into a large signal. Generally, each pixel may contain between 100 to 2,500 APDs per mm$^2$, with each of the microcells having a length of 20-100 microns.

Figure 4:
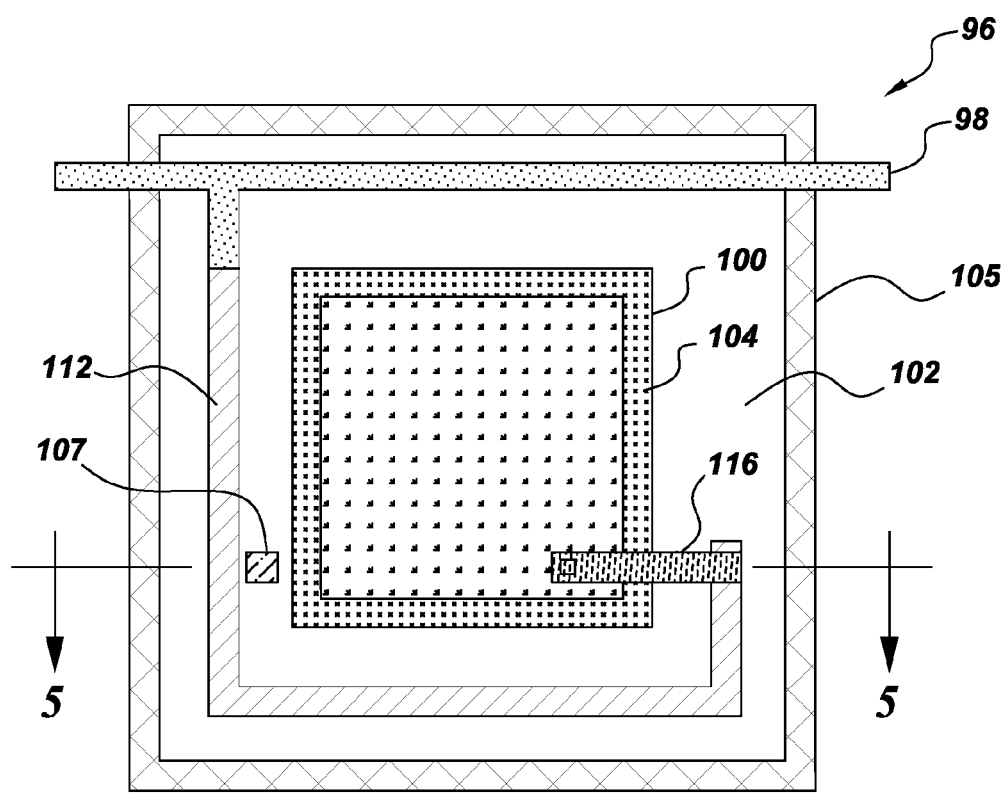
FIG. 4 and FIG. 5 are top plan and cross sectional views of a microcell in the solid-state photomultiplier, in accordance with one embodiment of the present disclosure.
Figure 5:
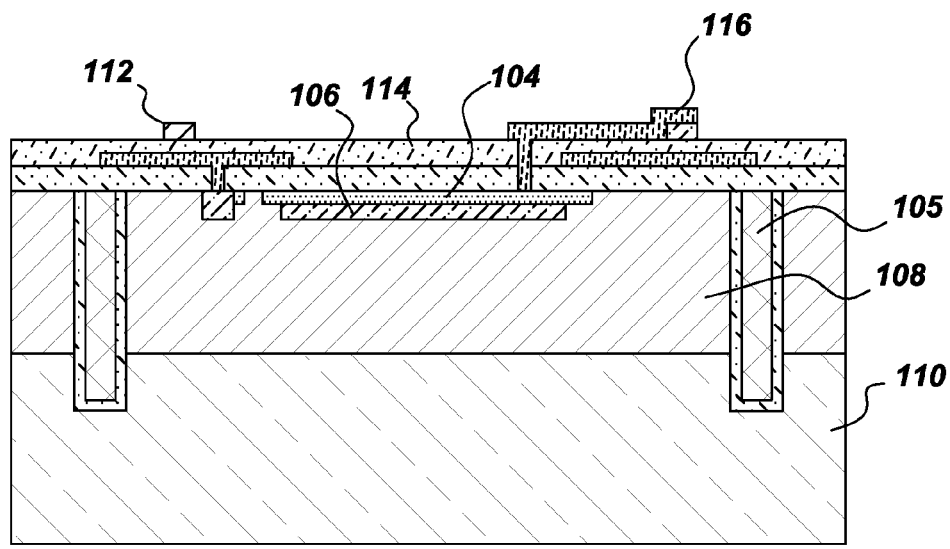

FIGS. 4 and 5 are, respectively, a top plan and a cross sectional view of a microcell 96 of the photon-counting photo detector layer 56 or a solid-state photo multiplier layer (SSPM). In one of the embodiments, each of the microcells 96 operates as an individual Geiger-mode APD a few volts above a breakdown voltage, with each microcell being virtually identical to all the other microcells. In this mode of operation, an electron generated by the absorption of an optical photon initiates an avalanche breakdown that is confined to an individual microcell when the one or more photons are absorbed by that microcell. In such an embodiment, a single discrete unit of electrical charge may be emitted from the microcell independent of the number of photons absorbed therein. That is, for each Geiger breakdown, the output signal of the microcell has the same time dependent response and charge, except for small variations due to differences from cell to cell introduced in the production process. For quenching the avalanche, resistors may be employed.

As shown in FIG. 4 and FIG. 5, each microcell 96 is connected to a conductive grid 98 on the front side of the pixel. Each microcell 96 includes an active area 100 surrounded by a metal light shield/cathode 102 that includes a cathode contact 107. The cathode contacts are provided on front side contacts in one embodiment but could be made on the backside of the wafer through vias and could be used for both anode and cathode contacts to provide backside connections. In one embodiment, the active area 100 is comprised of a 'P+' anode 104, 'N' implant 106 to convert optical photons into a corresponding electrical signal, and a barrier layer 114. A trench 105 is coated with a thin dielectric layer and filled with opaque metal in order to prevent the emission or absorption of light photons from one microcell to the next. The active area 100 may also be electrically isolated from the remainder of microcells 96 by an 'N+' guard (not shown).

Connection between active area 100 of each microcell 96 and the conductive grid 98 may be formed by way of a resistor 112, composed of a suitable material such as polysilicon in one embodiment. The resistor 112 is typically formed on the insulating layer 114. The resistor 112 may be connected to the active area 100 of microcell 96 by way of vias and functions to limit the current transferred from the microcell 96 to the conductive grid 98. The resistors also serve to quench the avalanche in the microcell once the cell capacity discharges. By way of resistors 112 and conductive grid 98, the independently operating APD cells may be electrically connected through metal connections 116 such as metal electrodes and the individual outputs of all the microcells 96 may be summed to form a common readout signal in the depicted embodiment. That is, the output of each pixel is determined by the sum of the discrete electrical charge units from the microcells 96 that fire. The resulting output from each pixel is in the form of an analog pulse with a charge that is proportional to the number of absorbed photons. The metal contact 116 is disposed on an absorption layer 108. The absorption layer 108 is disposed on a substrate layer 110.

In one embodiment, the array of microcells 96 in each pixel amplify single optical photon arrivals into a large signal by way of the individual APD elements operating in Geiger-mode. The structure of the pixel in this embodiment may provide nearly noiseless, high gain amplification in the range of $10^5$-$10^6$, such that even a single optical photon can be detected and resolved. Thereby eliminating the need for additional preamplifiers in such an embodiment. This gain may be achieved at a relatively low bias or supply voltage range of about 30-70 V in this embodiment.

In addition to photon counting, however, the present multi-layer detector arrangement also performs charge integration of signals when photon-counting operations are infeasible in view of the amount of X-ray flux present. In particular, in certain embodiments, the SSPM output is linear for a given incident photon flux only if the number of generated photons per microcell is small, such as below $1\times10^6$ cps/mm$^2$. In such embodiments, as the photon flux increases, the SSPM output signal will saturate. In such circumstances, charge-integration may be preferred for these systems at high flux levels, such as above $\sim 1\times10^7$ cps/mm$^2$.

Figure 6:
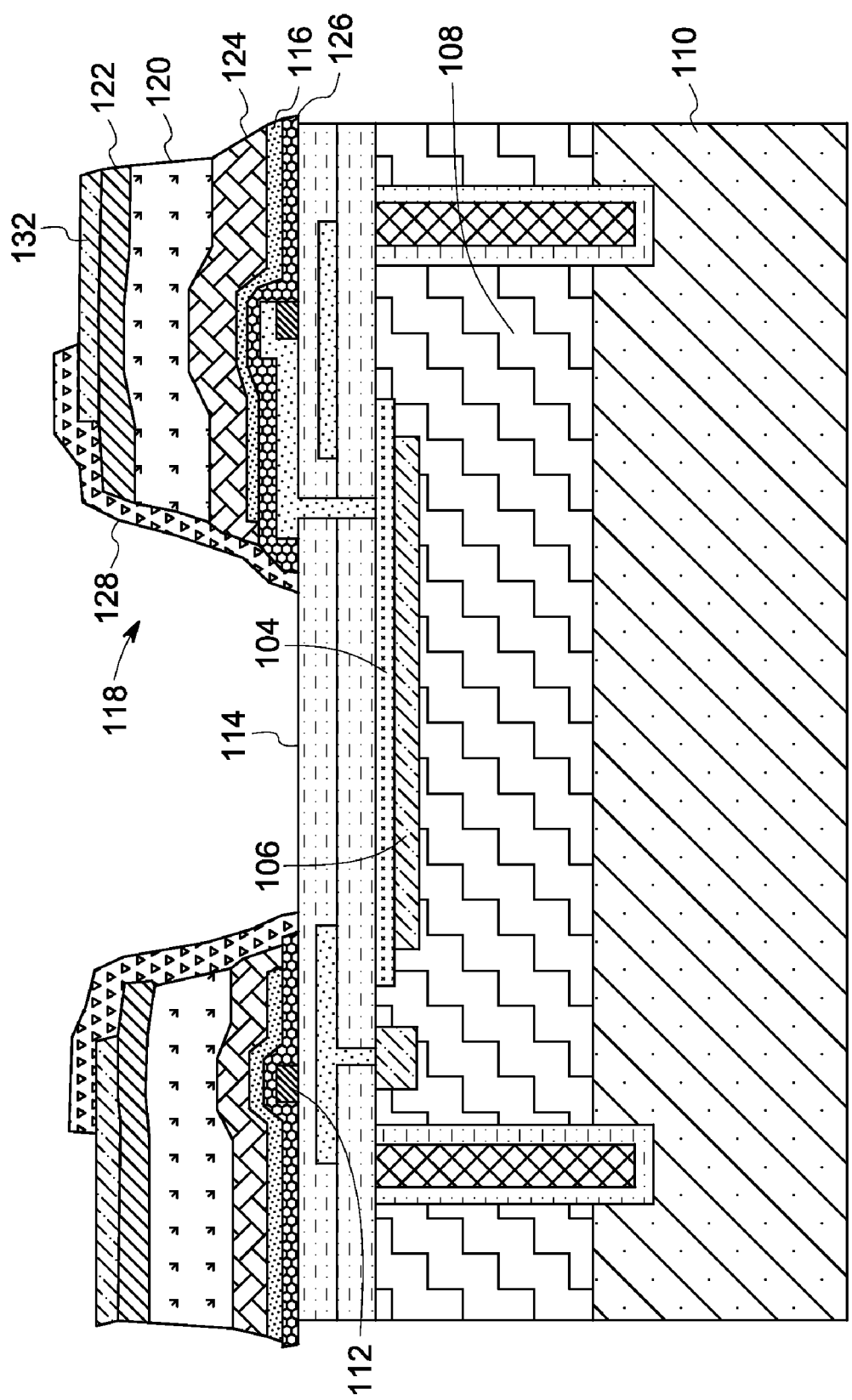
FIG. 6 is a cross sectional view of charge integrating diodes with amorphous silicon deposited over inactive regions of solid-state photomultiplier of FIG. 5, in accordance with one embodiment of the present disclosure.

With the foregoing in mind, FIG. 6 is a cross section view of a multi-layer detector assembly in accordance with the present technique. In the depicted example, charge-integrating diodes in the form of amorphous silicon photo detectors (ASPDs) are deposited over inactive regions of a photon-counting photo detecting layer 18 in the form of a solid state photomultiplier (SSPM), as discussed above. In one embodiment the charge-integrating photo detector layer 54, such as the depicted ASPDs, is disposed only over inactive areas of the SSPM layer. For example, in the depicted embodiment of FIG. 6, charge integrating photosensor elements 118 are disposed over inactive areas 116 or around the photon-counting photosensor elements. In one embodiment, the charge-integrating photosensor element consists of the amorphous silicon photodiode layer 120. The photodiode array 120 may be made of either a-Si or any other suitable organic photodiode array. In the depicted embodiment, the amorphous silicon layer 120 is sandwiched between a 'p+' a-Si layer 122 and 'n+' a-Si layer 124, wherein the 'n+' a-Si layer 124 provides an ohmic contact with the bottom metal electrode 116 (for example, aluminum in one embodiment). In the depicted embodiment, a suitable dielectric medium 126 limits the interaction of signals from charge integrating photosensor elements and photon counting photosensor elements. Passivation layer 128 may be provided for the charge-integrating elements to be passive in relation to the photon-counting photosensor elements. Thus, when X-ray photons impinge on the detector elements, the scintillator elements, which are optically coupled to the multilayered photo detector elements, convert the X-ray radiation to optical photons suitable for detection by the charge integrating photo detector layer and the solid-state photomultiplier layer. The multilayered photo detector may be configured in such a way so as to receive and detect both high and low flux optical photons simultaneously.

Referring now to FIG. 7, in another embodiment the entire SSPM microcell array may be covered with a charge integrating photo diode layer. In such an embodiment, the charge integrating photodiode layers may be made from a semi-transparent amorphous silicon layer 130 or semi-transparent organic photodiode layer. In one embodiment the charge-integrating photosensor elements 118 are disposed over substantially all of the surface area of the photon-counting photo detector layer 56, such as a suitable solid-state photomultiplier layer (SSPM). For example, in one embodiment, the charge-integrating photosensor elements are disposed over the entire area of the photon-counting photosensor elements. The thickness of the semi-transparent amorphous silicon layer can be adjusted to obtain a desirable fraction of charge integrating signal relative to photon-counting signal. In the depicted embodiment, transparent amorphous silicon photodiode layer 130 is sandwiched between 'p+' amorphous silicon layer 122 and 'n+' amorphous silicon layer 124. In the depicted embodiment, transparent electrodes 132 sandwich the entire charge integrating photosensor layers so as to allow optical photons to interact with the multilayer charge integrating photosensor array and photon counting photo detector array. Thus, optical photons from the scintillator elements are acquired by the multilayer photo detector elements, which are integrated over a time period and measured by DAS 32 In this way, the charge-integration elements 118 allow the detector to accommodate higher flux rates than photon-counting detection mechanisms.

In another embodiment, the charge integrating sensor is an organic photodiode. The elements of such an organic charge integrating photodiode may include two semi-transparent charge conducting electrodes, one acting as a positive charge collector, the other as a negative charge collector and an organic film between the two electrodes. The electrodes may be comprised of a doped thin metal oxide film, such as $SnO_2$, $ZnO_2$, indium tin oxide, or it may be comprised of thin metal film using such elements as silver, gold, or aluminum. The conductive electrodes may be prepared using physical vapor deposition or via sputter coating techniques. Between the electrodes there may be one or more organic materials that produce charged carriers following the absorption of light. Typically charge separation is achieved by juxtaposing two materials such that the most stable state of the electron (negative charge carrier, electron acceptor) is on one material, and the hole (positive charge carrier, electron donor) is on the other. One example of such a material pair is 3,4,9,10-perylene tetracarboxylic bisbenzimidazole (PTCBI, an electron acceptor), and copper phthalocyanine (CuPc, an electron donor). Another possible material pair includes poly(2-methoxy-5-(3',7' dimethyloctyloxy) 1,4, phenylene-vinylene, (MDMO-PPV) and (6,6) phenyl-C61-butyric acid methyl ester (PCBM). In addition, hybrid structures consisting of both organic components (such as poly- phenylene-vinylene derivatives) and inorganic nanocrystals of materials such as CdSe, or ZnTe may also be used. Such nano-crystalline materials may vary in size and shape, from ~2 nm spheres to high aspect ratio rods of order microns in size, or may even possess multiple high aspect rods connected to a single core. The electron donor and acceptor materials may be deposited in either discrete layered structures or blended together.

The organic devices may be composed of many layers, each of which can vary from a few nm to microns in thickness. Typical thicknesses of the organic layers are on the order of 10 nm-100 nm. Such multilayered devices may be prepared either by solution processing or via physical vapor deposition techniques. Multilayer solution processed devices may be formed by the successive application of materials using solvents that do not dissolve underlying layers. A suitable first layer for a solution processed device is poly(3,4-ethylenedioxythiophene):poly(styrenesulfonate) (PDOT:PSS) which does not dissolve in many organic solvents, followed by a blend of (MDMO-PPV and PCBM) deposited from an organic solvent such as chlorobenzene. Multilayer organic structures may also be formed by physical vapor deposition of successive thin organic films, which may consist of one or more component molecules. As in the case of the amorphous silicon based photodiode, the overall thickness of the organic layers may be adjusted to obtain a desirable fraction of charge integrating signal relative to photon-counting signal.

The organic light sensing element can be fabricated directly on the photon counting element or fabricated on a substrate and then applied to the photon counting element via the use of an optical coupling adhesive such as Norland™ 68 or 3M optical coupling adhesive. The substrate can be fabricated from either glass or a polymer film, such as poly carbonate or PET (Polyethylene terephthalate). The organic photodiode may have additional transparent coatings in order to improve the resistance of the detector to water or oxygen degradation. Once optically integrated with the photon counting detector, the organic light sensing element can be operated either as a completely photovoltaic cell or as a photodetector to which a 1V-20V voltage bias is applied in order to efficiently extract the charge carriers from the photo-detector.

With the foregoing in mind, FIG. 8 is a generic flowchart illustrating an exemplary process of image acquisition, image processing, and image generation, such as using the CT system of FIG. 1 when employing the radiation detector of FIG. 2 in accordance with one aspect of the present technique. The image acquisition of the subject or object is made after positioning the subject (Block 134) and activating the radiation source (Block 136 of an imaging system to emit X-rays. Attenuated signals are collected (Block 138) from the photodetector layers (i.e., photon counting photosensor elements and charge integrating photosensor elements) through a read out circuitry separately provided for each of photodetector layers. Transmitting signals to the DAS are processed and stored (Block 140). Moreover, image reconstruction is performed (Block 142) based on signals received from at least one of the photodetector layers and the final image obtained is displayed (Block 144) for detailed evaluation and diagnosis.

The multilayered radiation detector assembly as discussed herein is capable of detecting both low flux and high flux X-ray photons simultaneously. In certain embodiment, the charge integrating diode is deposited over the inactive areas of SSPM, thereby providing an overall geometric fill factor of the device, which is superior to devices in which the charge integrating and photon counting photo sensors are formed on the same semiconductor wafer. Also, simultaneous operation of the photo detector and photosensor layers ensure that switching is not required between the X-ray flux count rates. Added to these features, when the photodiode is deposited over the entire SSPM structure, the thickness of the amorphous silicon photo detector layer may be altered to fine tune the ratio of charge integrating and photon counting signals.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A radiation detector comprising:
   a charge integrating photodetector layer;
   a photon counting photodetector layer disposed beneath the charge integrating photodetector layer; and
   a scintillator disposed on a side of the charge integrating photodetector layer opposite to the photon counting photodetector layer and configured to receive radiation and to convert the radiation to lower energy photons suitable for detection by the charge integrating photodetector layer and the photon counting photodetector layer, wherein the charge integrating photodetector layer is substantially disposed over inactive areas or around the photon counting photodetector layer, and not over at least a portion of active areas of the photon counting photodetector layer.

2. The radiation detector of claim 1, wherein the photon counting photodetector layer comprises a solid state photomultiplier layer.

3. The radiation detector of claim 1, wherein the charge integrating photodetector layer comprises an organic photodiode array, wherein the organic photodiode array comprises one or more organic materials and a pair of electrodes.

4. The radiation detector of claim 1, wherein the charge integrating photodetector layer comprises a semi transparent organic photodiode array.

5. The radiation detector of claim 3, wherein the electrodes are comprised of metal, metal oxide, and metal alloy.

6. The radiation detector of claim 5, where the electrodes are comprised of silver, gold, aluminum, and compositions thereof.

7. The radiation detector of claim 3, wherein the electrodes are comprised of a metal oxide.

8. The radiation detector of claim 7, wherein the electrodes are comprised of zinc, tin, indium and compositions thereof.

9. The radiation detector of claim 3, wherein the organic materials are blended together in a single layer.

10. The radiation detector of claim 3, wherein the organic materials form two or more organic layers that are stacked together.

11. The radiation detector of claim 3, wherein at least one of the organic materials is an inorganic nanocrystal.

12. The radiation detector of claim 11, wherein the inorganic nanocrystal is comprised of cadimium, selenium, tellurium, and compositions thereof.

13. The radiation detector of claim 11, wherein the inorganic nanocrystal is comprised of multiple high aspect ratio rods connected to a common core.

14. The radiation detector of claim 3, wherein at least one of the organic materials is a derivatized fullerene.

15. The radiation detector of claim 14, wherein the derivatized fullerene is (6,6) phenyl-C61-butyric acid methyl ester (PCBM).

16. The radiation detector of claim 3, wherein at least one of the organic materials contains a sulfur-carbon bond.

17. The radiation detector of claim 16, wherein the organic material is poly(3,4- ethylenedioxythiophene):poly(styrenesulfonate) (PDOT:PSS).

18. The radiation detector of claim 3, wherein one of the organic materials contains 2 or more fused aromatic rings.

19. The radiation detector of claim 18, wherein the organic material is 3,4,9,10-perylene tetracarboxylic bisbenzimidazole.

20. The radiation detector of claim 3, wherein the organic material is conjugated polymer.

21. The radiation detector of claim 20, where the conjugated polymer is poly( 2-methoxy-5-(3',7' dimethyloctyloxy) 1,4, phenylene-vinylene.

22. The radiation detector of claim 3, wherein the organic material is an organo-metallic compound.

23. The radiation detector of claim 22, wherein the organo-metallic compound is copper phthalocyanine.

24. The radiation detector of claim 1, wherein the charge integrating photodetector layer and the photon counting photodetector layer is disposed on a single semiconductor wafer.

25. The radiation detector of claim 1, wherein charge integrating photodetector layer is comprised of charge integrating photosensor elements and the photon counting photodetector layer is comprised of photon counting photosensor elements, and wherein the radiation detector is configured to provide a plurality of electrical signals based upon signals acquired from the charge integrating photosensor elements and the photon counting photosensor elements.

* * * * *